Feb. 4, 1964  J. C. HENLEY  3,120,043
SELF LOCKING CLEAT
Filed June 1, 1962  2 Sheets-Sheet 1
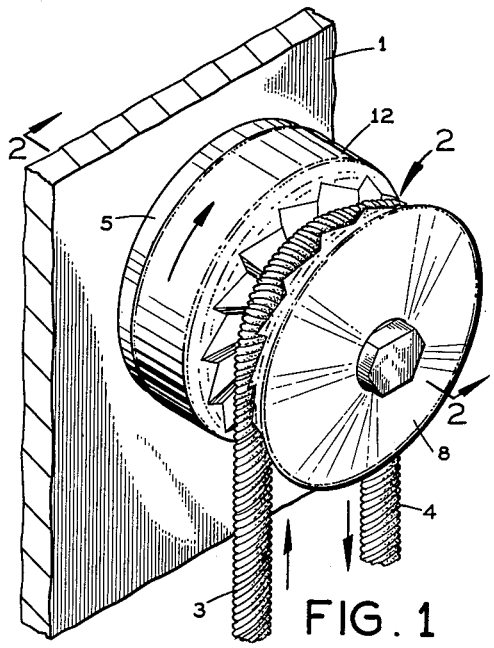
FIG. 1
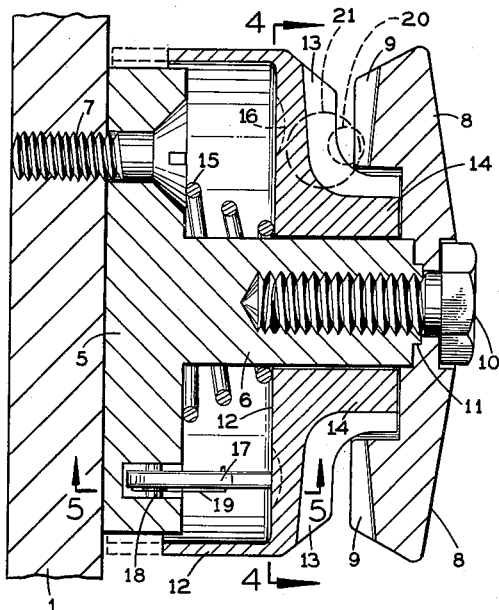
FIG. 2
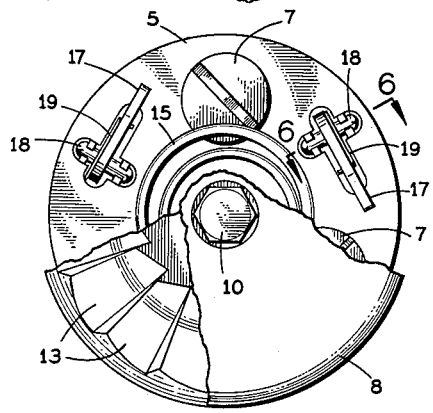
FIG. 3
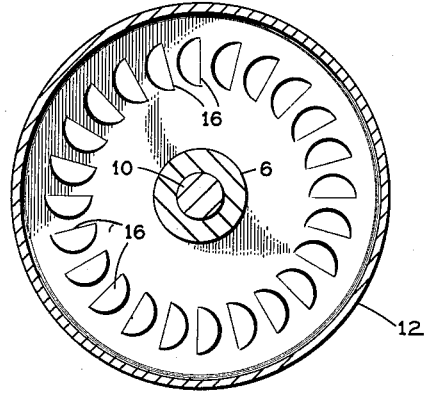
FIG. 4
FIG. 6
FIG. 5
INVENTOR.
J. CARL HENLEY
BY
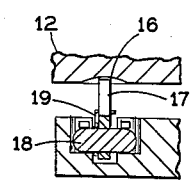

Feb. 4, 1964  J. C. HENLEY  3,120,043
SELF LOCKING CLEAT
Filed June 1, 1962  2 Sheets-Sheet 2
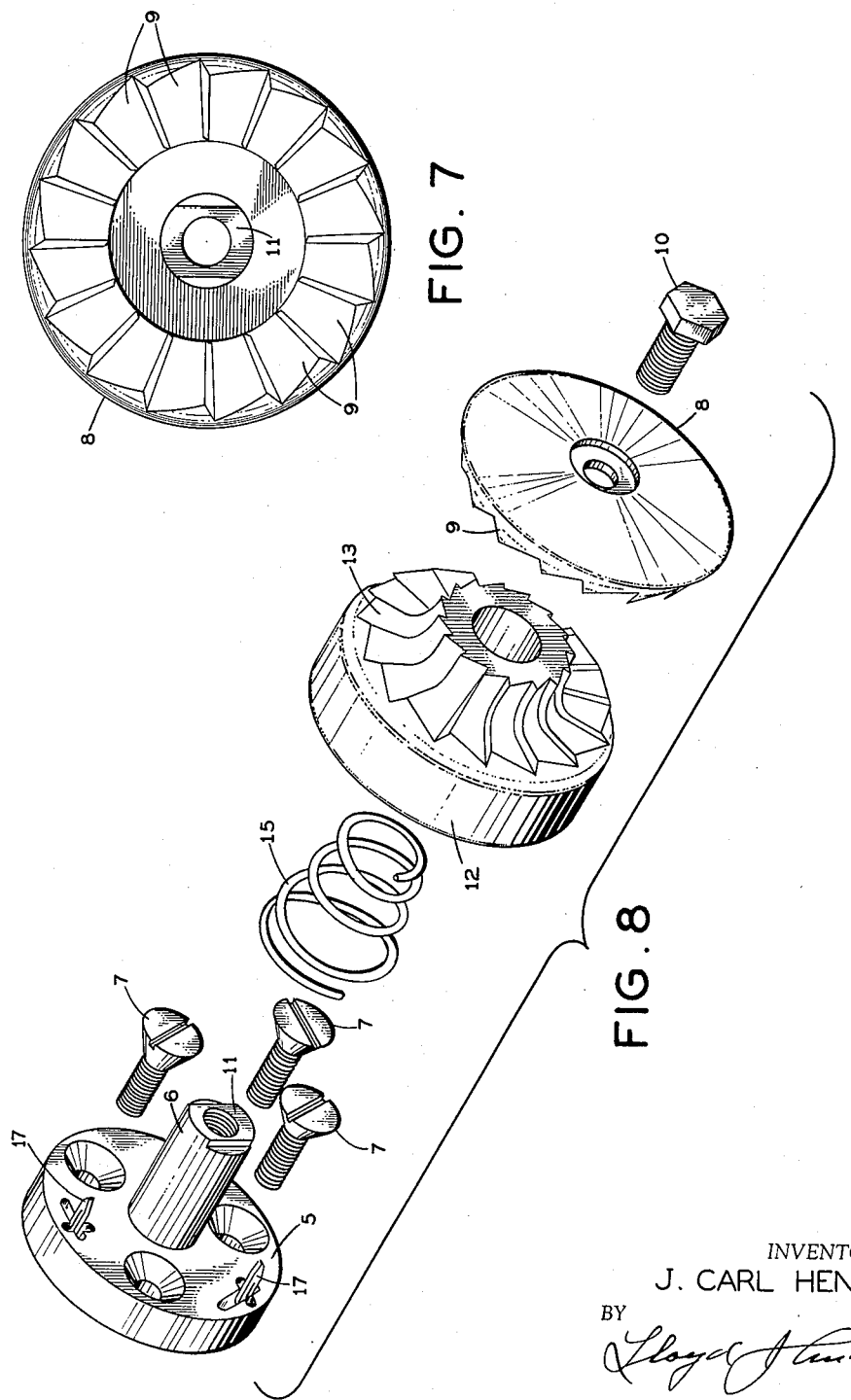
INVENTOR.
J. CARL HENLEY
BY

United States Patent Office 3,120,043
Patented Feb. 4, 1964

3,120,043
SELF LOCKING CLEAT
J Carl Henley, Box 7886 Trusler Hall, Gainesville, Fla.
Filed June 1, 1962, Ser. No. 199,421
4 Claims. (Cl. 24—132)

This invention relates in general to fastening means for rope, line or cords and more particularly to a self-locking cleat for securing rope and the like, such as used in connection with marine devices, awnings, and other rope operated equipment.

Conventional fixed cleats require the rope to be entwined thereabout and secured thereto with a form of knot, such as a half hitch. It is well known that the fastening and unfastening of rope to a conventional cleat is not only time consuming but often results in lack of security, particulary when the rope is subjected to moisture.

The present invention overcomes the above objections and disadvantages by the provision of a self-locking rotary cleat on which a rope may be secured or released therefrom by a simple manual maneuver and is adapted to lock the rope with a high degree of security.

A principal object of the invention is the provision of a rotary self-locking cleat for securing ropes of a predetermined wide variety of diameters.

A further object of the invention is the provision of a cleat comprising a fixed member and a rotary member for retaining a rope therebetween for linear movement in a tightening direction only.

Another object of the invention is the provision of a rotary cleat for retaining a rope thereon including a fixed member and a spring urged rotary member including adjacent positioned teeth on each of said members for engaging a rope therebetween.

These and other objects in one embodiment of the invention are described and shown in the appended specification and drawing in which:

FIG. 1 is a perspective view of the rotary cleat with typical rope secured therein.

FIG. 2 is an enlarged cross sectional view taken through section line 2—2, FIG. 1, in changed position.

FIG. 3 is a top view of the cleat shown in FIG. 1 with a portion thereof broken away.

FIG. 4 is a cross sectional view taken through section line 4—4, FIG. 2.

FIG. 5 is a fragmentary cross sectional view taken through section line 5—5, FIG. 2.

FIG. 6 is a cross sectional view taken through section line 6—6, FIG. 3.

FIG. 7 is a bottom plan view of an element shown in FIG. 2.

FIG. 8 is an exploded view of the cleat shown in FIG. 1.

FIG. 1 illustrates the rotary self locking cleat attached to a body 1 and retaining a rope between a rotary gripping member and a fixed gripping member. It is to be noted that an annular V groove 2 is provided at the junction of the two gripping members for guiding the rope into locked position therebetween. The rope ends 3 and 4 represent the tight and free ends respectively.

Referring to FIG. 2, a cylindrical base 5 having a coaxial hub 6 is secured to body 1 by three screws 7.

A fixed gripping member 8 having a plurality of equi-spaced radial teeth 9 on the inner face thereof, better shown in FIG. 7, is secured to the outer end of hub 6 by screw 10 as shown.

A double D key 11 on the end of hub 6 engages corresponding flats in member 8 to secure same against rotation.

A rotary gripping member 12 is journalled for rotation and reciprocation on hub 6 and includes a plurality of equi-spaced radial teeth 13 which are formed in a hub portion 14 of member 12 and follow a curvilinear path through the outer face thereof.

It is to be noted that it is preferred that the teeth 9 and 13 are of opposite hand in order that a proper wedging action at opposite sides of the rope is accomplished without damage thereto.

It is to be noted that a recess on the inner side of the member 8 is provided for the entry of a portion of the hub 14 of member 12.

A conical spring 15 is positioned around the hub 6 between the outer surface of base 5 and the inner face of member 12 for urging the latter into its outward idle position as shown.

FIGS. 3 through 6 show a ratchet means for permitting rotation of the rotary member in the direction of the arrows shown in FIG. 1 and preventing rotation thereof in the opposite direction.

FIG. 4 shows a plurality of radial teeth 16 in the inner face of member 12 and FIG. 3 shows two of three ratchet pawls 17 secured for movement about radially positioned pins 18, which pins are retained in pockets in the base by staking means. Each pawl is urged in outward direction by a torsion spring 19 secured to each pawl and bearing against the base 5 better shown in FIG. 5.

FIGS. 5 and 6 illustrate the effective range of the ratchet means when the rotary member is in each of its extreme axial positions respectively.

FIG. 8 illustrates all of the elements of the cleat in their relative positions in an exploded longitudinal view.

In operation a portion of the rope to be secured is placed in and partially around the groove 2 and the free end of the rope manually pulled around the groove with sufficient force to move member 12 toward the base 5 against the restraining action of spring 15 and partially wrap around the hub portion of member 12 and become engaged between the teeth 9 and 13 as illustrated in FIGS. 1 and 2. By pulling the free end of the rope the member 12 will be rotated pulley-like and permit the slack to be taken from the fixed end thereof which position will be maintained by the wedging action of teeth 9 and 13 on the rope and the action of the ratchet pawls 17 engaging teeth 16 on member 12 which prevents counter rotation of the member 12.

It is now apparent that the cleat will secure the rope in a predetermined unidirectional position against reverse movement. The rope may be released from the cleat by the simple counter movement of the free end of the rope around the cleat about its axis.

It has been found that the edges of the teeth 9 and 13 should include a slight radius to prevent damage to the rope since adequate security is attained because of the relatively large number of teeth in contact with the rope which are under the constant pressure of spring 15.

It is to be noted that although a single pawl 17 will prevent counter rotation of the rotor member, the three equally disposed pawls contribute to the strength of the device, particularly since the pawls must act at different angles corresponding to the longitudinal position of the rotary member as required by ropes of two extreme diameters, illustrated by dotted circles 20 and 21 in FIG. 2.

It is to be understood that certain modifications in the above construction utilizing the features described are intended to come within the scope of the appended claims.

Having described my invention, I claim:
1. A cleat for securing a rope comprising a means forming a base,
   a rotary gripping member journalled for rotation about and predetermined reciprocation along a fixed axis on said base,
   said rotary member having a first plurality of teeth on one side thereof positioned in radial relation to said axis, a fixed gripping member secured to said base including a second plurality of teeth in radial relation to said axis and positioned adjacent said first plurality of teeth, spring means for urging said rotary member toward said fixed member, ratchet means mutually associated with said base and said rotary member for permitting rotation of the latter in one direction and locking same against counter rotation whereby a rope forced between a portion of said first and second pluralities of teeth against the restraining action of said spring means will be secured against linear movement in a direction opposite the rotation of said member in said one direction.

2. A cleat for securing a rope comprising a base member adapted to be secured to a body including a cylindrical hub with the axis thereof substantially normal to said body, a rotary gripping member journalled for rotation and reciprocation on said hub including a first plurality of radial teeth on the outer side thereof, a fixed gripping member secured on said hub having a second plurality of radial teeth on the inner side thereof positioned adjacent said first plurality of teeth for gripping said rope therebetween, a spring means for urging said rotary member toward said fixed member, ratchet means mutually associated with said base and said rotary member adapted to permit rotation of the latter in one direction and locking same against counter rotation whereby a rope gripped between a portion of said first and second pluralities of teeth may be moved in a predetermined linear direction and secured against linear movement opposite said direction.

3. A cleat for securing a rope comprising a base member adapted to be secured to a body including a cylindrical hub with the axis thereof substantially normal to said body, a rotary gripping member journalled for rotation and reciprocation on said hub including a first plurality of radial teeth on the outer side thereof, a fixed gripping member secured on said hub having a second plurality of radial teeth on the inner side thereof positioned adjacent said first plurality of teeth for gripping said rope therebetween, a spring positioned around said hub between said base member and said rotary member for urging the latter toward said fixed member, ratchet means mutually associated with said base and said rotary member adapted to permit rotation of the latter in one direction and locking same against counter rotation whereby a rope gripped between a portion of said first and second pluralities of teeth may be moved in a predetermined linear direction and secured against linear movement opposite said direction.

4. A cleat for securing a rope comprising a base member adapted to be secured to a body including a cylindrical hub with the axis thereof substantially normal to said body, a rotary gripping member journalled for rotation and reciprocation on said hub including a first plurality of radial teeth on the outer side thereof, a fixed gripping member secured on said hub having a second plurality of radial teeth on the inner side thereof positioned adjacent said first plurality of teeth for gripping said rope therebetween, a spring means for urging said rotary member toward said fixed member, said rotary member having a plurality of ratchet teeth on the inner side thereof equi-distant from said axis, at least one spring urged ratchet pawl pivoted in said base for movement about an axis normal the axis of said hub position for engagement with each of said ratchet teeth whereby a rope gripped between a portion of said first and second pluralities of teeth may be moved in a predetermined linear direction and prevented from movement in opposite direction by engagement of said pawl with one of said ratchet teeth.

References Cited in the file of this patent

UNITED STATES PATENTS

| 103,643 | Mooney | May 31, 1870 |
| 227,100 | Parsons et al. | May 4, 1880 |
| 565,212 | Kurtis | Aug. 4, 1896 |
| 565,699 | Spencer | Aug. 11, 1896 |
| 693,881 | Morgan | Feb. 25, 1901 |
| 1,442,396 | Goetz | Jan. 16, 1923 |